United States Patent [19]
Gerhold

[11] 3,979,281
[45] Sept. 7, 1976

[54] CONTINUOUS LIQUID EXTRACTION PROCESS WITH PERIODIC FLOW OF THE DENSER STREAM

[75] Inventor: Clarence G. Gerhold, Palatine, Ill.

[73] Assignee: Universal Oil Products Company, Des Plaines, Ill.

[22] Filed: Dec. 16, 1974

[21] Appl. No.: 533,435

[52] U.S. Cl. ............................ 208/311; 23/267 C; 208/317; 260/705; 423/658.5
[51] Int. Cl.² .................................... C01G 21/00
[58] Field of Search ............ 208/311, 317; 260/705; 23/267 C; 423/658.5

[56] References Cited
UNITED STATES PATENTS

| | | |
|---|---|---|
| 2,228,434 | 1/1941 | Belden ............................... 208/311 |
| 2,367,671 | 1/1945 | Dickinson et al. ................... 208/311 |
| 2,610,108 | 9/1952 | Packie ................................ 208/317 |
| 2,794,711 | 6/1957 | Hall et al. ........................... 208/311 |

Primary Examiner—Herbert Levine
Attorney, Agent, or Firm—James R. Hoatson, Jr.; Robert W. Erickson; William H. Page, II

[57] ABSTRACT

A liquid-liquid extraction process utilizing a tower having perforated contacting trays. The discontinuous flow of the denser downward moving stream prevents the backmixing of this stream on the contacting trays and increases the efficiency of the extraction.

7 Claims, 1 Drawing Figure

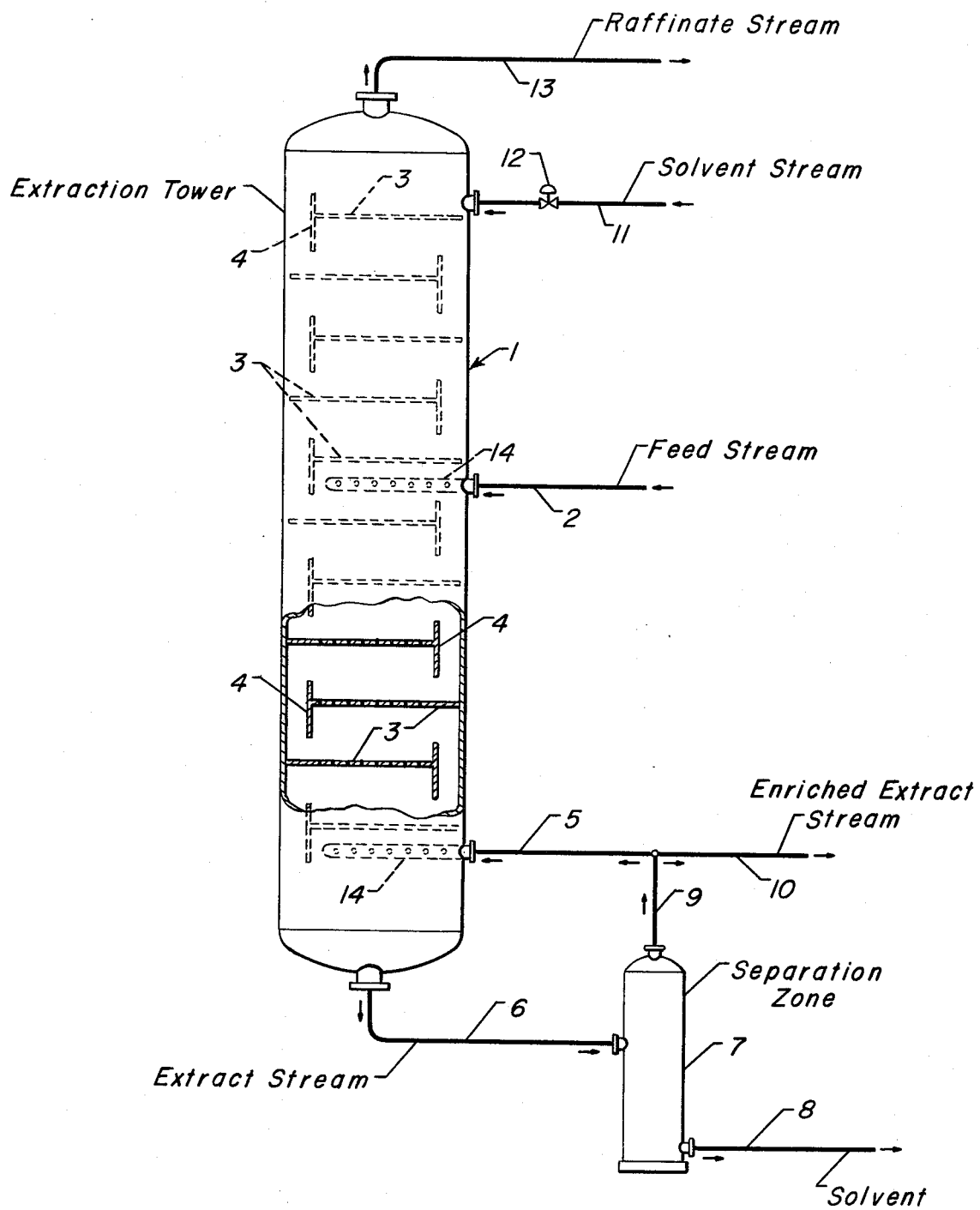

CONTINUOUS LIQUID EXTRACTION PROCESS WITH PERIODIC FLOW OF THE DENSER STREAM

FIELD OF THE INVENTION

The invention relates to a process for the purification or separation of liquid hydrocarbons by continuous countercurrent solvent extraction similar to those processes found in Classes 208-311 to 208-337.

PRIOR ART

Liquid-liquid extraction is well established as a commercial method of separating hydrocarbons. It is often used when separation by distillation is more expensive or impractical. Instruction in the design of extraction units and the selection of suitable equipment is provided in the standard references such as *The Chemical Engineers' Handbook*, 4th Ed., McGraw-Hill Publishing Co. A very extensive review of the art is contained in a number of articles published on pages 49–104 of *Chemical Engineering Progress*, (Vol. 62, No. 9) September 1966. Specific examples are contained in U.S. Pat. Nos. 3,435,087 (Cl. 260-674), 3,642,614 (Cl. 208-321), 3,652,452 and 3,723,303 (Cl. 208-325).

The prior art has recognized that the backmixing of the continuous phase which occurs in a spray type column reduces the efficiency of that operation. Some form of obstruction such as packing is therefore often provided within the column. One of the most common forms of internal structure is a horizontal perforated plate or tray similar to a sieve type fractionation tray. These units function in one of two ways. Either a layer of the denser liquid is retained on each tray and the lighter liquid passes upward through the perforations in the tray or a layer of the less dense liquid is held under the tray and the heavier liquid falls through the perforations. The thickness of the layers is controlled by a weir, and the material in the layer is serially transferred by a downcomer or riser to the next tray. In these prior art processes, the flow of both liquids into the extraction column is continuous and substantially constant. The use of a reflux stream formed by reducing the solvent content of the extract stream is also well known.

There is a substantial amount of literature devoted to what is termed a pulsed extraction column. The pulsations referred to in these references is a periodic bi-directional movement of the entire contents of the extraction column. The pulsations may have a frequency of about 1–10 cycles per second and an amplitude of about 0.1–1.0 inch. The purpose of these pulses is to cause intimate contacting and mixing of the two phases and to thereby increase mass transfer rates. The invention does not relate to this type of pulsed column.

DESCRIPTION OF THE DRAWING

The drawing depicts the operation of an extraction tower 1 used in the contacting of a hydrocarbon feed mixture with a denser solvent material.

A continuous multicomponent feed stream enters a middle portion of the perforated plate extraction tower 1 through line 2. The extraction tower is completely filled with liquid phase material. The feed stream is spread under a perforated contacting tray 3, by a distribution means 14, and forms a layer of the feed stream under the tray. A solvent stream having a greater density than the feed stream enters through line 11 at a rate controlled by valve 12. The flow of the solvent stream is discontinuous, and it enters as a series of preselected quantities. The passage of one of these quantities into the tower causes a substantially equal amount of the solvent material on the feed tray to overflow the upper lip of downcomer 4 and descend as a pulse to the next tray. This causes a pulse of the solvent stream material to move undirectionally downward through the tower.

The feed stream is continuously passes into the extraction tower. This stream is serially trapped under each of the perforated plates 3 as it rises through the tower. The feed stream jets through the perforations on the trays and intimately contacts the layer of the solvent stream held on the trays. The preferentially dissolved components of the feed stream enter the solvent layer. This results in the formation of a raffinate stream comprising the undissolved components of the feed stream and which is withdrawn through line 13. The solvent stream falls to the bottom of the tower and is removed as an extract stream in line 6. The extract stream is passed into a separation zone 7 wherein it is divided into a solvent stream discharged in line 8 and an enriched extract stream removed in line 9. A first portion of the enriched extract is withdrawn as a product stream in line 10. A second portion of the enriched extract is returned to the extraction tower through line 5 as a reflux stream. The discontinuous flow of the solvent stream results in the pulsed flow of the extract stream below the point at which the feed stream enters the column.

DETAILED DESCRIPTION

Liquid-liquid extraction, also referred to as solvent extraction, is a widely used commercial process in the petrochemical and petroleum processing industries. The process is used to separate or remove one desired compound from a mixture of other compounds. It is often resorted to when these compounds may not be separated by fractional distillation or other means. For instance, aromatic hydrocarbons may be separated from a mixture of paraffinic hydrocarbons having the same boiling point range through the use of liquid extraction. For this separation the total hydrocarbon mixture is intimately contacted with an immiscible solvent which preferentially dissolves either the aromatic or the paraffinic hydrocarbons, and the mixture and the solvent are then allowed to form separate phases. The solvent is then subjected to a second separation step, such as fractionation, which liberates the preferentially dissolved hydrocarbons.

These solvent extraction processes may be conducted in a single batch operation or with a method which employs several discrete batch contacting steps. However, to obtain the benefits of continuous operation and to achieve a maximum degree of separation with a limited amount of equipment, liquid-liquid extraction processes are normally conducted in a multiple-stage extraction tower. A stream of a denser material, which may be either the solvent stream or the feed stream, is injected into an upper portion of the tower and begins to descend. A stream of the less dense material is passed into a lower part of the extraction tower and rises countercurrently to the denser stream. The solvent stream must be chosen to be a substance which preferentially dissolves the desired components of the feed stream and is not miscible with the feed stream. Those skilled in the art have compiled a considerable listing of suitable solvent materials for particular hydrocarbon mixtures. For instance, aromatic hydrocarbons may be extracted with diglycolamine, diethylene glycol, dipropylene glycol, tetraethylene glycol or N-formylmorphaline. These are usually mixed with water to form the actual solvent solution. Another widely used solvent is one of the sulfolane type. Specific types of this solvent are listed in such references as U.S. Pat. No. 3,652,452. Yet another family of chemical compounds suitable for aromatics extraction are the sultones as described in U.S. Pat. No. 3,723,303.

An extraction tower which is essentially devoid of internal structures is referred to as a spray-type tower since one of the liquid phases is sprayed into a continuous phase of the other. The performance of this type of tower may be improved by placing horizontal structures in the flow path of the two liquid streams which prevent the backmixing of the continuous phase. One of the most common and widely used type of internal structure is a perforated plate similar in structure to that used as a fractionation tray in a rectification column. This contacting tray or plate has a large amount of its surface area devoted to small perforations which allow the flow of one of the liquids through the tray in a manner similar to the rising vapor in a rectification column. Each of the perforated contacting trays also has a downcomer leading to the tray below it and extending upward above its top surface to form a weir which limits liquid flow. The height of this weir determines the amount of the "heavier" liquid which is retained on the individual contacting tray. This amount is referred to as the liquid inventory of the tray. The denser liquid will overflow this weir when more of the heavy material is fed onto the tray. This design forces the "lighter" material to bubble up through the heavier material and thereby results in the intimate contacting of the two liquid phases. It is also common to invert this internal structure and maintain a trapped layer of the lighter liquid below the perforated trays. The weir is then located on the bottom of the tray and the lighter liquid passes through risers. The denser liquid passes through the perforations in the trays and downward through the layers of the less dense material. As in distillation, there is a wide variety of contacting structures which may be placed within these towers and a wide range of designs for the perforated section of the tray. For instance, in many perforated plate towers, the plates are made with the perforations in vertical sections of the tray. In this design, the light liquid jets horizontally into a continuous phase of the heavier material resting upon the tray.

The rate of mass transfer at the liquid-liquid interface is greatly affected by the amount of turbulence which is present. The turbulence is proportional to the power input to the tower. This power is often supplied by a central rotating agitator vertically disposed within the tower. As an alternative method of producing this power input in the central portions of the tower and thereby increasing the rate of mass transfer, the prior art has developed what is termed a pulsed extraction column. In its most common form, the total liquid contents of the tower are subjected to a hydraulic pulsation having a frequency of about 1–10 cycles per second and an amplitude of about 0.1 to 1.0 inch. This causes the contents of the tower to quickly rush through the perforations that are provided at a very high velocity which results in good mixing and in good mass transfer. This is often performed by utilizing a driven diaphragm in the lower portion of the tower or by charging the continuous phase to the tower in a pulsing stream produced by piston action pump. A second method of pulsing a tower involves the periodic vertical movement of the perforated plates to produce the high flow rate through the perforations in the tray.

Neither of these methods of pulsing an extraction tower are the subject matter of this invention. The liquid-liquid extraction method described herein involves a pulsation in the flow of the denser material which is charged to the extraction column. The pulsations discussed herein therefore consist of the passage of a predetermined quantity of the denser liquid into the extraction column and then a complete cessation of the flow of the liquid into the column for a definite and sizable length of time. This produces a unidirectional movement of this denser material downward through the tower.

When a pulse, a predetermined quantity of the denser material, is charged into the tower it will cause the displacement of a substantially equal quantity of this denser liquid from the feed tray. This displaced quantity will then flow rapidly down the downcomer to a second tray located below and displace a like quantity. This continues down to the point at which the denser liquid is removed. Each of the newly arrived quantities of liquid is then allowed to remain on its respective perforated tray and is contacted with the rising, less dense liquid until these materials approach equilibrium. Another pulse of the denser material is then charged to the tower and the process of serially moving a slug of the dense material downward through the tower is repeated. This results in what is referred to herein as a discontinuous flow of the denser material through the tower. The purpose of this discontinuous flow is to contact the two phases and to then shift the denser material to a new contacting zone with a minimum of backmixing between the material entering the perforated tray and that material residing on the tray and previously subjected to extraction. The stream containing the desired component and which enters the extraction tower from an external source is referred to herein as the feed stream. The other externally derived stream entering the tower and which preferentially dissolves the desired component is referred to as the solvent stream. The two effluent streams of the process are the extract stream and the raffinate stream. The extract stream is formed by the solvent stream plus the dissolved component of the feed stream, and the raffinate stream comprises the feed stream minus the components dissolved into the solvent stream.

The denser stream will enter the extraction tower at a higher point than the less dense stream. In the simplest arrangement, the denser stream will enter the top of the tower and the less dense stream will enter the bottom of the tower. However, if reflux is to be used, then the feed stream will enter at some intermediate point in the tower. This intermediate point is separated from both the top and the bottom of the tower by a number of contacting trays as shown in the drawing to allow contacting the extract stream with the reflux stream. Reflux is supplied to the extraction tower in order to increase the degree of separation between the components of the feed stream. The reflux performs this function by providing a stream having a higher concentration of the desired components than the feed stream, thereby increasing the driving force for mass transfer. This results in a higher concentration of the extracted component in the extract stream. When the feed stream is denser than the solvent stream, the reflux will enter the top of the tower. When the feed stream is the less dense of the two input streams, then reflux will enter the bottom of the tower. Extract reflux is supplied by returning a portion of the extract layer from which the solvent has been wholly or partly removed. This is performed in a separation zone which normally consists of a fractionation column. The solvent can then be recycled to the other end of the tower. Similarly, to produce a raffinate reflux stream, a part of the raffinate layer is mixed with the incoming solvent. The desirability of raffinate reflux however has been questioned since it fails to produce any change in the composition of the raffinate stream. When the reflux enters the top of the tower, that is when reflux is used and the feed stream is denser than the solvent stream, then it is within the scope of this process to pulse the flow of the reflux stream. There are several limitations on the utilization of reflux which are known to the art. These include the requirements that the refluxed material has a sufficiently different specific gravity to cause it to flow countercurrently through the tower and that it is not miscible with the material leaving the respective end of the tower.

In the practice of the process of this invention, there is maintained a continuous flow of the less dense phase, which is normally a solvent stream, upward through the extraction tower. By the term "continuous," it is intended to mean that the instantaneous flow rate of this stream will not be zero, but will be some discrete number indicative of a continuous addition of this stream to the extraction tower. Similarly, by the term "discontinuous," it is intended to mean that the flow of this particular stream will periodically cease. This however does not mean that a continuous stream must have a constant rate of flow, since most streams are normally adjusted from time to time to obtain optimum performance from a particular processing unit. It is the denser of the streams entering the extraction tower which is pulsed in this process. This means that a preselected quantity of that stream will be periodically injected into the extraction tower. This results in a discontinuous flow of that stream within the tower. This preselected quantity is based upon an analysis of the liquid inventory maintained upon one of the perforated trays. It is preferred that the preselected quantity be equal to, or slightly less than, this liquid inventory. These pulses may be produced by a valve means located in the appropriate liquid transfer line or by a mechanical proportioning device.

In the normal method of operating an extraction tower, there are two continuous flows passing in opposite directions. The effect of the downward flow of the denser material onto a tray is a continuous addition of uncontacted material from the tray above and the transfer of contacted material from this tray to the next tray below. This results in the maintenance of a more or less uniform average concentration of the tray's liquid inventory at some dynamic equilibrium with the upward flowing solvent stream. The driving force that is available to induce mass transfer is dependent upon the concentration differences in the two phases. Under the condition of dynamic equilibrium produced by two continuous streams, the concentration of the denser material is at some intermediate point between a time equilibrium and the concentration of the incoming stream. The driving force is therefore limited and cannot reach the full potential of the difference between the two streams at the concentrations at which they enter the perforated tray. The objective of the invention is to supply a method of operating an extraction tower which prevents or reduces the backmixing upon each perforated tray and therefore provides a higher driving force and greater efficiency per tray. This objective is achieved by serially moving the contents of each perforated tray downward through the tower in a batch-type fashion. The backmixing of the rich incoming stream with the partially treated contents of the tray is thereby minimized. The material would preferably be pulsed before it reaches the composition of the prior art dynamic equilibrium conditions. The material is then very rapidly moved to the next tray. To allow the desired rapid pulsing, the downcomers should be oversized compared to the continuous mode of operation. It may also be desirable to redesign the perforated trays to induce a plug flow pattern of movement of the incoming pulse across the tray to the downcomer.

The invention may therefore be characterized as a method of operating a liquid-liquid extraction process which comprises the steps of: passing a feed stream having an unconstant instantaneous flow rate, which includes evenly spaced periods of time during which the rate of flow is zero, into an extraction tower containing a plurality of perforated contacting trays, the feed stream entering at an intermediate point in the extraction tower vertically spaced below an upper first end of the extraction tower and above a lower second end of the extraction tower; passing a solvent stream comprising a solvent which preferentially dissolves a desired component of the feed stream into the lower second end of the extraction tower at a constant rate of flow; removing an extract stream from the upper first end of the extraction tower; separating the extract stream and effecting the formation of a reflux stream having a higher concentration of the desired component than the extract stream, and passing the reflux stream into the upper first end of the extraction tower; and removing a raffinate stream from the lower second end of the extraction tower.

I claim as my invention:

1. In a liquid-liquid extraction process wherein a high density first liquid is passed into a first portion of an extraction tower containing a plurality of perforated contacting trays, a second liquid having a lower density than the first liquid is continuously passed into a lower second portion of the extraction tower at a constant rate of flow, and the first liquid and the second liquid are contacted as the second liquid passes unidirectionally upward through a layer of the first liquid maintained on the perforated contacting trays, the improvement in the method of operation of the process which comprises passing the first liquid of higher density into the extraction tower in the form of a stream having a discontinuous flow rate comprised of preselected quantities of the first liquid corresponding to the amount of first liquid maintained on one of said perforated contacting trays, which discontinuous flow rate effects a pulsed flow of the first liquid downward between contiguous contacting trays.

2. A method of operating a perforated plate liquid-liquid extraction tower which comprises:
   a. passing a low density feed stream into a lower end of a perforated plate liquid-liquid extraction tower containing a plurality of contacting trays at a constant rate of flow, passing the feed stream unidirectionally upward through the tower and continuously removing the feed stream in the form of a raffinate stream at an upper end of the extraction tower;
b. periodically passing a selected quantity of a higher density solvent stream corresponding to the amount of said solvent maintained on one of said perforated contacting trays into an upper end of the extraction tower to effect a discontinuous unidirectional flow of the solvent stream downward through the extraction tower; and,
c. removing an extract stream from the lower end of the extraction tower.

3. A method of operating a perforated plate liquid-liquid extraction tower containing a plurality of perforated contacting trays which comprises:
a. passing a low density solvent stream into a lower end of a perforated plate liquid-liquid extraction tower at a constant rate of flow, passing the solvent stream unidirectionally upward through the tower and continuously removing the solvent stream in the form of an extract stream at an upper end of the extraction tower;
b. periodically passing a selected quantity of a higher density feed stream corresponding to the amount of said feed stream maintained on one of said perforated contacting trays into the extraction tower to effect a discontinuous unidirectional flow of the feed stream downward through the extraction tower; and
c. removing a raffinate stream from the lower end of the extraction tower.

4. The method of claim 3 further characterized in that the feed stream has a discontinuous instantaneous flow rate including evenly spaced periods of time during which the rate of flow is zero.

5. A method of operating a liquid-liquid extraction process which comprises the steps of:
a. unidirectionally and intermittently passing a selected quantity of a high density feed stream corresponding to the amount of said feed stream maintained on one of the hereafter mentioned perforated contacting trays having an unconstant instantaneous flow rate, which includes evenly spaced periods of time during which the rate of flow is zero, through an extraction tower containing a plurality of perforated contacting trays, the feed stream entering at an intermediate point in the extraction tower vertically spaced below an upper first end of the extraction tower and above a lower second end of the extraction tower;
b. passing a low density solvent stream comprising a solvent which preferentially dissolves a desired component of the feed stream into the lower second end of the extraction tower at a constant rate of flow;
c. removing an extract stream from the upper first end of the extraction tower;
d. separating the extract stream and effecting the formation of a reflux stream having a higher concentration of the desired component than the extract stream; and
e. passing the reflux stream into the upper first end of the extraction tower.

6. The improvement of claim 1 further characterized in that said first liquid of high density is a hydrocarbon mixture and said second liquid of lower density is a solvent for components of said hydrocarbon mixture.

7. The improvement of claim 1 further characterized in that said second liquid or lower density is a hydrocarbon mixture and said first liquid of higher density is a solvent for components of said hydrocarbon mixture.

* * * * *